June 12, 1923.

E. F. KINGSBURY

PHOTOGRAPHIC SHUTTER

Filed Dec. 6, 1919

1,458,211

Inventor
Edwin F. Kingsbury

Patented June 12, 1923.

1,458,211

UNITED STATES PATENT OFFICE.

EDWIN F. KINGSBURY, OF RUTHERFORD, NEW JERSEY.

PHOTOGRAPHIC SHUTTER.

Application filed December 6, 1919. Serial No. 342,873.

*To all whom it may concern:*

Be it known that I, EDWIN F. KINGSBURY, a citizen of the United States, residing at Rutherford, in the county of Bergen and State of New Jersey, have invented certain new and useful Improvements in Photographic Shutters, of which the following is a specification.

The present invention relates to photographic shutters for cameras and consists in the combinations and arrangements of elements hereinafter described and particularly set forth in the accompanying claims.

The invention has for its purpose to provide for cameras a focal plane shutter, of the roller curtain type, having means for conveniently and variably regulating the extent of exposure opening and which can be readily actuated from the exterior of the camera.

A further purpose of the invention is to provide a shutter control means of this type having a gauge or indicator associated therewith to the end that the extent of exposure opening of the shutter may be accurately determined without inspecting the exposure opening itself with the consequent disadvantages that this would entail.

Figure 1:
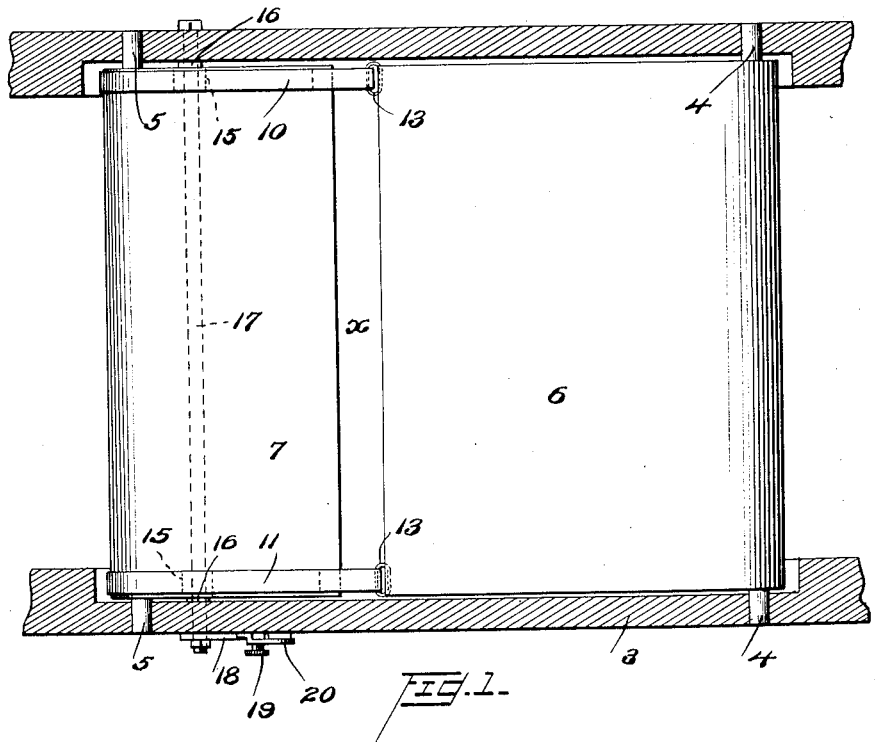
Figure 2:
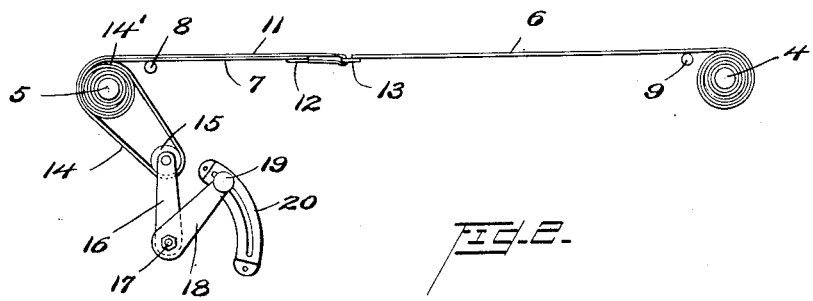

The invention is disclosed by way of an illustration in the accompanying drawing, wherein Fig. 1 is a top plan view of a focal plane shutter showing the device applied thereto, and Fig. 2 a side elevational view thereof, with the supporting structure removed.

Referring to the construction in further detail and wherein like reference characters designate corresponding parts in the different views shown 3 indicates the camera body or casing having the usual pair of rollers 4 and 5 on which are wound the respective parts 6 and 7 of the shutter curtain, and said rollers are preferably of the spring tensioned type usually employed. The ordinary pair of idler rollers 8 and 9 for the shutter curtain are located to engage their respective curtain sections adjacent the rollers 4 and 5 as shown.

The shutter curtain actuating device per se consists of a pair of flexible members or tapes 10 and 11, each having one end 12 secured to the curtain section 7 adjacent the corner edge thereof as shown, and thence looped through the ring or eyelet 13 secured to the corresponding corner of the curtain section 6. Each of the tapes passes freely over the roller 5, thence provides a looped portion 14, and has its other end 15 attached to any approved manner to the roller 5 in such a way that the tape will be wound or unwond evenly upon said roller as the latter takes-up or lets-out the curtain section 7.

The looped portions 14 of both tapes 10 and 11 are engaged by a pair of take-up or idler rollers 15 mounted on the arms 16 which are in turn fixedly secured to the shaft 17 that is journalled in the camera frame 3.

The two idler rollers 15 are operated to take-up or let-out the shutter curtain sections by the lever 18 that is fixedly secured to the shaft 17 at a point outside of the camera casing and it will therefore be obvious that any angular movement given said lever 18 will impart a corresponding adjustment to the exposure opening X of the shutter curtain, and that such exposure opening may be regulated at will.

To the end that the extent of the exposure opening may be controlled without an inspection of the opening itself there is provided an arc or quadrant plate 20 secured to the outer side of the camera and provided with suitable marks of graduation to be read in conjunction with the lever operating handle 19 as shown.

It will be understood, of course, that while the invention as disclosed herein is of a specially designed construction that the invention is not limited to such structure but may on the other hand depart therefrom and employ such mechanism as may be deemed of advantage to use, within the scope of the claims.

What is claimed as new is:

1. In a photographic curtain shutter, the combination of, a pair of rolls, curtain shutter sections on said rolls providing an exposure opening therebetween, flexible members having fixed and looped connections with said shutter sections at the respective adjacent edges thereof, an additional loop for said flexible members, means for holding the curtain sections under tension, and take-up devices engaging with the additional loop of said flexible members operable to vary the extent of said exposure opening.

2. In a photographic curtain shutter, the combination of, a pair of rolls, curtain shutter sections on said rolls providing an exposure opening therebetween, flexible members having fixed and looped connections with said shutter sections at the respective adjacent edges thereof, an additional loop for said flexible members, means for holding the curtain sections under tension, and idler rollers engaging with the additional loop of said flexible members operable to vary the extent of said exposure opening.

3. In a photographic curtain shutter, the combination of, a pair of rolls, curtain shutter sections on said rolls providing an exposure opening therebetween, flexible members having fixed and looped connections with said shutter sections at the respective adjacent edges thereof, means for holding the curtain sections under tension, idler rollers engaging with said flexible members, levers on which said idler rollers are mounted, and means for operating said levers to vary the extent of said exposure opening, substantially as set forth.

4. In a photographic curtain shutter, the combination of, a pair of rolls, curtain shutter sections on said rolls providing an exposure opening therebetween, flexible members having fixed and looped connections with said shutter sections at the respective adjacent edges thereof, means for holding the curtain sections under tension, idler rollers engaging with said flexible members, a shaft, levers on said shaft carrying said idler rollers, and means for operating said shaft to vary the extent of said exposure opening, substantially as set forth.

5. In a photographic curtain shutter, the combination of, a pair of rolls, curtain shutter sections on said rolls and providing an exposure opening therebetween; a pair of tapes having fixed connections with one of said shutter sections and one of the rolls, and looped engagement with the other shutter section; a pair of idler rollers engaging with said tapes between their respective fixed ends, and means for operating said idler rollers to vary the extent of said exposure opening, substantially as set forth.

6. In a photographic curtain shutter, the combination of, a pair of rolls, curtain shutter sections on said rolls and providing an exposure opening therebetween; a pair of tapes having fixed connections with one of said shutter sections and one of said rolls, and looped engagement with the other shutter section; a pair of idler rollers engaging with said tapes between their respective fixed ends, lever arms carrying said idler rollers, a shaft on which said lever arms are mounted, and a lever for operating said shaft to vary the extent of said exposure opening, substantially as set forth.

7. In a photographic curtain shutter, the combination of, a pair of rolls, curtain shutter sections on said rolls providing an exposure opening therebetween, flexible members connecting said curtain shutter sections, idler rollers engaging said flexible members, a lever arm connected to actuate said idler rollers to vary the extent of said exposure opening, and a graduated quadrant associated with said lever arm for indicating the extent of the exposure opening, substantially as set forth.

8. In combination with the curtain shutter sections of a photographic shutter, a flexible tape engaging at the front end the two free ends of said shutter sections to keep them in spaced relationship, attaching means for the remaining end of said flexible tape, additional means for providing a loop between the said ends of the tape, and means for increasing and decreasing the size of said loop.

In testimony whereof I affix my signature.
EDWIN F. KINGSBURY.